United States Patent [19]
Kawahira et al.

[11] Patent Number: 4,574,873
[45] Date of Patent: Mar. 11, 1986

[54] AIR CONDITIONING APPARATUS FOR CARS

[75] Inventors: Hiroto Kawahira; Mitsuo Yasuda, both of Shizuoka, Japan

[73] Assignee: Mitsubishi Denki Kabushiki Kaisha, Tokyo, Japan

[21] Appl. No.: 610,431

[22] Filed: May 15, 1984

[30] Foreign Application Priority Data

Jun. 20, 1983 [JP] Japan ................................. 58-110350

[51] Int. Cl.[4] .............................................. B60H 3/04
[52] U.S. Cl. ....................................... 165/42; 62/244; 98/2.07
[58] Field of Search ............... 236/13; 62/244; 165/42, 165/43; 98/2.07

[56] References Cited

U.S. PATENT DOCUMENTS

| | | | |
|---|---|---|---|
| 2,295,750 | 9/1942 | Norris et al. | 165/43 X |
| 3,327,603 | 6/1967 | De Castelet | 98/2.07 |
| 4,216,822 | 8/1980 | Izumi | 165/42 |
| 4,320,628 | 3/1982 | Okajima | 62/244 X |
| 4,326,667 | 4/1982 | Murata et al. | 236/13 X |
| 4,356,965 | 11/1982 | Matsushima et al. | 236/13 X |
| 4,383,642 | 5/1983 | Sumikawa et al. | 236/13 X |
| 4,456,166 | 6/1984 | Kagohata | 236/13 |

*Primary Examiner*—William E. Tapolcai
*Attorney, Agent, or Firm*—Oblon, Fisher, Spivak, McClelland & Maier

[57] ABSTRACT

An air conditioning apparatus for car comprising: an air intake fan having internal and external air inlet ports and internal and external air change-over dampers; a heat exchanger for cooling and a heat exchanger for warming, both being arranged in series at the downstream of said air intake fan and in the direction substantially perpendicular to the direction of the air flow; a by-pass route provided above and in parallel with the heat exchanger for warming; and air mixing changer formed at the downstream of said heat exchanger for warming and said by-pass route; and an air blow-off port and a control damper for controlling direction of the air flow provided at the downstream of the air mixing chamber. The air intake fan, said heat exchanger for cooling, said heat exchanger for warming, said by-pass route, said air mixing chamber, said each air blow-off port, said each control damper and a water draining device are all installed in the same casing in the order as mentioned. The casing is made separable between said air intake fan and said heat exchanger for cooling, and said air intake fan is installed above a front deck portion enclosed by a cowl top outer panel and a cowl top inner panel or to the side of the engine room, and the remaining portion is installed in the vehicle cabin to be connected with said air intake fan.

5 Claims, 9 Drawing Figures

FIGURE 1 PRIOR ART
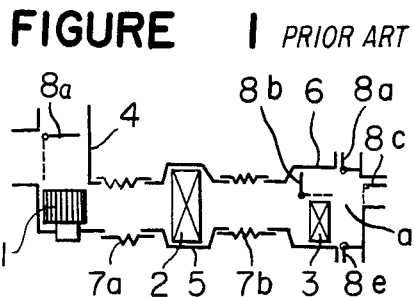
FIGURE 2 PRIOR ART
FIGURE 3
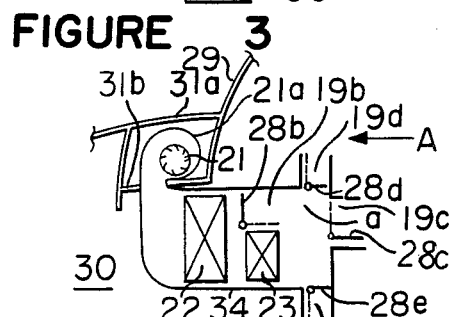
FIGURE 4
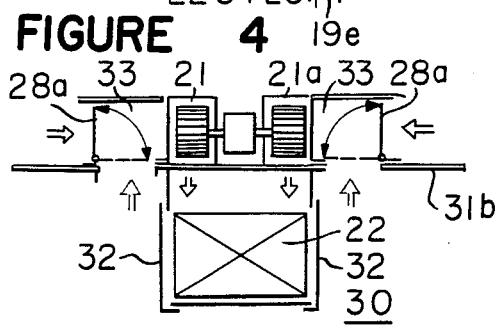
FIGURE 5
FIGURE 6
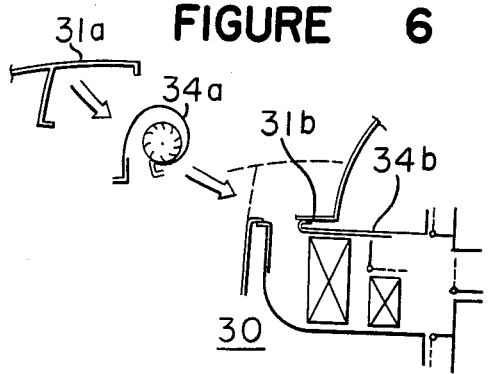
FIGURE 7
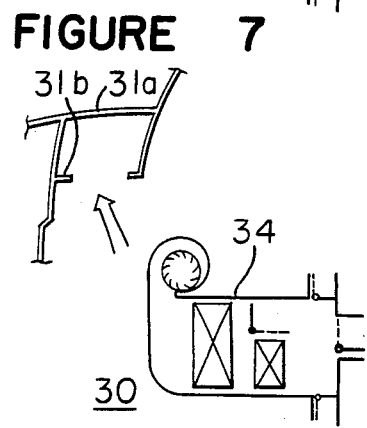
FIGURE 8
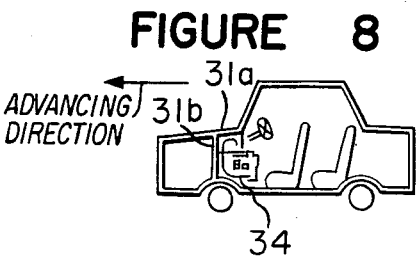
FIGURE 9
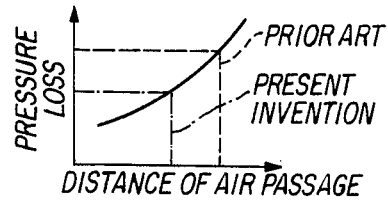

AIR CONDITIONING APPARATUS FOR CARS

BACKGROUND OF THE INVENTION

1. Field of the Invention

This invention relates to a compactly constructed air conditioning apparatus for cars.

2. Description of the Prior Art

Conventionally, the air conditioning apparatus for cars has been in such a construction and layout in the vehicle cabin as shown in FIGS. 1 and 2 of the accompanying drawing. That is to say, in FIG. 1, a fan unit 4 having internal and external air inlet ports, a damper 8a, and an air intake fan 1; a cooling unit 5 having a heat-exchanger 2 for cooling and a casing; and a warming unit 6 having a heat-exchanger 3 for warming, an air mixing damper 8b, an air mixing chamber a, and dampers 8c, 8d and 8e, each being provided at its corresponding air blow-off port are arranged in sequence from the side of the next-to-driver's seat. And, these units 4, 5 and 6 are connected one another with ducts 7a and 7b so that they may be in the arrangement and construction in the vehicle cabin as shown in FIG. 2.

According to such arrangement and construction as mentioned above, the fan unit 4 is disposed to the extreme side of the vehicle body beyond the next-to-driver's seat, and the warming unit 6 is arranged substantially at the center of the vehicle cabin. That is, all these units are layed out beneath the instrument panel of the vehicle, so that one half of the instrument panel from the center part of the vehicle cabin to the side of the next-to-driver's seat is inevitably occupied by the air conditioning apparatus. In such construction of the conventional air conditioning apparatus, living comfortableness of the next-to-driver's seat is inevitably sacrificed, which gives considerable impact on the shape of the instrument panel. Further, the air course of the intake air becomes longer to cause an increase in the pressure loss. Furthermore, such conventional air conditioning apparatus has many points for fitting the fan unit 4, the cooling unit 5, and the warming unit 6 in the narrow, limited space underneath the instrument panel in the vehicle cabin, which inevitably makes the fitting work to be troublesome and complicated. Moreover, in joining these units to one another, connecting bands are necessary, for which an additional space needs to be provided, and various other disadvantages.

SUMMARY OF THE INVENTION

The present invention has been made in view of the above-mentioned shortcomings inherent in the conventional air conditioning apparatus for cars, and aims at providing a compactly constructed air conditioning apparatus for cars.

Another object of the present invention is to provide an improved air conditioning apparatus for cars, for which, in particular, a casing for exclusive use in accommodating the heat exchanger for cooling, which has conventionally been disposed in the vehicle cabin, is eliminated so as to ameliorate the living comfortableness in the next-to-driver's seat.

Still another object of the present invention is to provide an improved air conditioning apparatus for cars which has realized a reduction in size and weight thereof, and which has attained easy mounting on the vehicle cabin and a decrease in noises to be generated therefrom by enabling the air intake fan to be installed in the front deck from outside of the vehicle cabin.

The other object of the present invention is to provide an improved air conditioning apparatus, from which the ducts for connecting the air intake fan, the heat exchanger for cooling, and the heat exchanger for warming are removed to reduce the pressure loss of the intake air, and which is so constructed as to enable the heat exchanger for cooling to be freely mounted and dismounted from either side of the driver's seat and the next-to-driver's seat, thereby making it possible to mount the heat exchanger for cooling at a later time when necessity arises, hence the same function as the late fitting of the cooling unit in the conventional air conditioning apparatus for cars can be expected.

According to the present invention, in general aspect, there is provided an air conditioning apparatus for a car comprising: an air intake fan having internal and external air inlet ports and internal and external air change-over dampers; a heat exchanger for cooling and a heat exchanger for warming which is in a smaller size than that of said heat exchanger for cooling, both being arranged in series at the downstream of said air intake fan and in the direction substantially perpendicular to the direction of the air flow; a by-pass route provided in parallel with said heat exchanger for warming which is constructed in a smaller size than that of the heat exchanger for cooling in utilization of an excess space produced by said heat exchanger for warming; an air mixing chamber formed at the downstream of said heat exchanger for warming and said by-pass route; and a plurality of air blow-off ports and control dampers for controlling direction of the air flow provided at the downstream of the air mixing chamber, said air intake fan having the internal and external air inlet ports and the internal and external air change-over damper, said heat exchanger for cooling, said heat exchanger for warming, said by-pass route, said air mixing changer, said air blow-off poarts, said control dampers, and a water draining device being all installed in one and the same casing in the order as mentioned, said air conditioning apparatus being characterized in that said air intake fan is installed above a front deck portion enclosed by a cowl top outer panel and a cowl top inner panel, or to the side of the engine room and the remaining portion is installed in the vehicle cabin to be connected with said air intake fan.

BRIEF DESCRIPTION OF DRAWING

The foregoing objects, other objects as well as specific construction and function of the air conditioning apparatus for automobiles according to the present invention will become more apparent and understandable from the following detailed description thereof, when read in conjunction with the accompanying drawing.

FIG. 1 is a schematic diagram showing a conventional air conditioning apparatus for cars;

FIG. 2 is a diagram showing a state of mounting on a car the air conditioning apparatus shown in FIG. 1;

FIG. 3 is a general layout diagram showing a state of mounting on the car of the air conditioning apparatus according to one preferred embodiment of the present invention;

FIG. 4 is an enlarged, schematic side view showing a construction of the air conditioning apparatus according to the preferred embodiment of the present invention;

FIG. 5 is a schematic front view showing the construction of the air conditioning apparatus shown in FIG. 4, as viewed in the direction of an arrow A;

FIG. 6 is a schematic structural side view showing a contruction of another embodiment of the air conditioning appartus according to the present invention;

FIG. 7 is a schematic structural side view showing a construction of still another embodiment of the present invention;

FIG. 8 is a schematic explanatory diagram showing a mounting position in the car of the air conditioning apparatus according to the various embodiments of the present invention shown in FIGS. 4 to 7; and FIG. 9, is a graphical representation showing comparison of characteristics between the conventional air conditioning apparatus and that of the present invention.

DETAILED DESCRIPTION OF PREFERRED EMBODIMENT

In the following, the present invention will be described in detail in reference to FIGS. 3 to 9 of the darwing.

FIG. 3 illustrates the arragement of the air conditioning apparatus according to the present invention, as actually mounted in a car cabin, from which it is seen that an integral unit 30 of the air conditioning apparatus is disposed substantially at the center of and beneath the instrument panel 29.

FIG. 4 is a side elevational view showing one embodiment of the air conditioning appartus according to the present invention, and FIG. 5 is a front view of the air conditioning apparatus of the present invention shown in FIG. 4, as viewed from the direction of an arrow A. It should be understood that, in FIGS. 3 to 8, the same reference numerals designate identical or equivalent parts.

In the following, explanations will be given in reference to FIGS. 4 and 5 as to the detailed construction of the air conditioning apparatus according to the present invention.

As seen from these drawing figures, the air conditioning apparatus according to the present invention is constructed with an air intake fan case 21a having internal and external air intake ports 33, 33; a pair of air intake fans 21,21 such as squirrel cage fans; an air mixing chamber a; mounting and dismounting openings 32, 32 for the heat exchange for cooling; air blow-off ports 19c, 19d and 19e, from which conditioned warm air is blown off toward predetermined directions such as the front window glass, the driver's seat, the next-to-driver's seat, and so on; and a water draining device (not shown in the drawing). Then, the internal and external air intake ports 33, 33 and the air intake fan case 21a are disposed in the front deck of the car to position the casing 34 as a whole below and at the substantially center part of the instrument panel 29 and extending along the length of the vehicle. Further, the air intake fan case 21a is disposed in a space enclosed by a cowl top outer panel 31a and a cowl top inner panel 31b, and, at the same time, within the casing 34 the air intake fans 21, 21, the heat exchanger 22 for cooling, and the heat exchanger 23 for warming which is smaller than the heat exchanger 22 for cooling are disposed in series with one another and in the direction perpendicular to the flowing direction of the intake air. In addition, a by-pass route 19b is provided above and in parallel with the heat exchanger 23 for warming wich is smaller in dimension than the heat exchanger 22 for cooling, in utilization of a space formed on top of the heat exchanger. Moreover, dampers 28a, 28b, 28c, 28d and 28e are provided at the internal and external air intake part, and at every predetermined air blow-off ports. In such construction of the air conditioning device, the air taken into the internal and external air intake ports 33, 33 passes through the air intake fan 21 and the heat exchanger 22 for cooling, after which the air is blown off into the vehicle cabin from any of the predetermined blow-off ports from the parallelly arranged by-pass route 19b or heat exchanger 23 for warming through the air mixing chamber a.

By thus installing the air intake fans 21, 21, the heat exchanger 22 for cooling, and the heat exchanger 23 for warming in one and the same casing 34, the unit of the air conditioning apparatus to be disposed in the vehicle cabin includes all the functions of the air conditioner in a single integral body. Further, in a car which does not require the cooling unit, the heat exchanger 23 for cooling is taken out of the casing by removing covers 32, 32 at the mounting and dismounting openings at either the driver's seat and the next-to-driver's seat, whereby it is possible to use the single integral unit 30 according to the present invention as the exclusive unit for warming.

FIG. 6 illustrates another embodiment of the air conditioning apparatus according to the present invention, wherein the unit casing 34 is made connectably separated into one portion 34a for the air intake fan case 21a having the internal and external air inlet port 33 and the internal and external air change-over damper 28a, and another portion 34b for the heat exchanger 22 for-cooling, and, moreover, the portion 34a of the air intake fan case 21a is made installable in the front deck from the top side or the engine room side, while the other portion 34b is made installable from inside of vehicle cabin. Further, the cowl top outer panel 31a can be freely mounted and removed for the convenience in the maintenance and repair services. The intake fan 34a is positioned above, and at least partially overlaps, the heat exchanger for cooling 22.

FIG. 7 illustrates still another embodiment of the air conditioning apparatus according to the present invention, wherein the single integral unit 30 is made mountable from the vehicle cabin side along. In this embodiment, the case 34 is not always required to be separated at the fan case portion 34a.

FIG. 8 is a general view of a car indicating a place where the single integral unit of the air conditioning apparatus according to the present invention is mounted.

FIG. 9 is a graphical representation showing a relationship between air passageway length and pressure loss. It is evident from this graphical representation that the single integral unit 30 of the air conditioning apparatus according to the present invention can reduce the air passageway length and the pressure loss to one half or so in comparison with the air conditioning apparatus of the conventional construction.

As stated in the foregoing, the present invention is constructed as mentioned in the foregoing, i.e., the single integral unit of the air conditioning apparatus is installed almost at the center part of the instrument panel 29 of the vehicle as shown in FIG. 3, and the internal and external air inlet ports 33, 33 and a portion of the air intake fan case 21a of the single integral unit 30 are disposed at the front deck part of the vehicle, with their being made mountable from outside of the vehicle cabin, whereby the external air intake fan unit and the cooling unit which occupied the space in the front face of the next-to-driver's seat can be removed from that place and the living comfortableness of the next-to-driver's seat becomes much improved, such arrangement or layout of the air conditioning unit contributing to reduction in noises within the vehicle cabin, as well as to the elimination of the need for the separate case and connecting ducts for the heat exchanger for cooling to thereby reduce size and weight of the air conduit and increase easiness in its mounting work, the resulting effect of which is remarkable.

Although, in the foregoing, the present invention has been described in detail with reference to the preferred embodiments thereof, it should be noted that the invention is not limited to these embodiments alone, but any changes and modifications may be made by those persons skilled in the art within the spirit and scope of the invention as recited in the appended claims.

What is claimed is:

1. An air conditioning apparatus for a vehicle comprising:

an air intake fan having internal and external air inlet ports and dampers for selecting one of said internal and external ports;

a heat exchanger for cooling and a heat exchanger for warming, both of said heat exchangers being arranged in series downstream of said air intake fan and in the direction substantially perpendicular to the direction of the air flow;

a by-pass route provided above and in parallel with the heat exchanger for warming;

an air mixing chamber formed downstream of said heat exchanger for warming and said by-pass route; and an air blow-off port and a control damper for controlling a direction of the air flow provided downstream of the air mixing chamber, wherein said air intake fan, said heat exchanger for cooling, said heat exchanger for warming, said by-pass route, said air mixing chamber, said air blow-off port, and said control damper are all installed in a single casing in the order as mentioned and in a longitudinal direction of said vehicle, wherein said casing is made separable between said air intake fan and said heat exchanger for cooling, wherein said casing includes means for removing and installing said heat exchanger for cooling from both the driver's seat and the next-to-driver's seat, and wherein said air intake fan is installed above a front deck portion enclosed by a cowl top outer panel and a cowl top inner panel of the engine room, and above said heat exchanger for cooling and a remaining portion of said apparatus is installed in the vehicle cabin and connected with said air intake fan.

2. The air conditioning apparatus for a vehicle according to claim 1 characterized in that said air intake fan is disposed at the front deck portion, and that said air intake fan is mounted from the side of the vehicle.

3. The air conditioning apparatus for a vehicle according to claim 1, wherein a pair of internal and external air inlet ports are spaced transverse to said longitudinal direction, and a pair of air intake fans are provided in correspondence to said pair of air inlet ports.

4. The air conditioning apparatus for a vehicle according to claim 4, wherein said pair of intake fans are constructed with squirrel cage fans, which are driven by a single electric motor.

5. The apparatus of claim 1, wherein said air intake fan at least partially overlaps a vertical plane containing said heat exchanger for cooling.

* * * * *